United States Patent [19]
Tomita

[11] Patent Number: 5,337,182
[45] Date of Patent: Aug. 9, 1994

[54] OPTICAL SCANNER

[75] Inventor: Kan Tomita, Tokyo, Japan

[73] Assignee: Ricoh Company, Ltd., Tokyo, Japan

[21] Appl. No.: 895,422

[22] Filed: Jun. 5, 1992

Related U.S. Application Data

[63] Continuation of Ser. No. 505,456, Apr. 6, 1990, abandoned.

[30] Foreign Application Priority Data

| Apr. 17, 1989 | [JP] | Japan | 1-97017 |
| May 17, 1989 | [JP] | Japan | 1-123190 |
| Jan. 31, 1990 | [JP] | Japan | 2-21785 |

[51] Int. Cl.$^5$ ............................................. G02B 26/10
[52] U.S. Cl. ................................. 359/217; 359/196; 359/205
[58] Field of Search ........................ 350/6.1–6.91; 250/234–236; 359/196–226, 245–255, 290–298, 662; 372/9, 24, 33–43, 101, 108

[56] References Cited

U.S. PATENT DOCUMENTS

| 4,323,297 | 4/1982 | Kawamura et al. | 350/6.8 |
| 4,466,701 | 8/1984 | Ogata et al. | 350/336 |
| 4,475,200 | 10/1984 | Lee | 372/24 |
| 4,589,735 | 5/1986 | Saunders | 350/280 |
| 4,715,699 | 12/1987 | Horimoto | 359/206 |
| 4,722,581 | 2/1988 | Hamada et al. | 359/205 |
| 4,729,617 | 3/1988 | Shimada et al. | 359/205 |
| 4,733,064 | 3/1988 | Ishikawa | 350/6.8 |
| 4,756,604 | 7/1988 | Nakatsuka et al. | 350/331 R |
| 4,762,397 | 8/1988 | Pepper | 350/347 V |
| 4,872,743 | 10/1989 | Sasa et al. | 350/353 |
| 4,896,948 | 1/1990 | Dono et al. | 350/347 V |
| 4,915,484 | 4/1990 | Yamamoto | 350/6.8 |
| 4,916,318 | 4/1990 | Iima | 350/6.8 |
| 4,919,520 | 4/1990 | Okada et al. | 350/347 R |
| 4,962,982 | 10/1990 | Takanashi | 359/205 |
| 5,033,806 | 7/1991 | Tomita et al. | 359/217 |

FOREIGN PATENT DOCUMENTS

| 61-184515 | 8/1986 | Japan | 350/6.8 |
| 151824 | 7/1987 | Japan | |
| 131515 | 5/1989 | Japan | 359/219 |

*Primary Examiner*—Loha Ben
*Assistant Examiner*—Thong Nguyen
*Attorney, Agent, or Firm*—Oblon, Spivak, McClelland, Maier & Neustadt

[57] ABSTRACT

An optical scanner includes a varifocal semiconductor laser light source for emitting a laser beam and displacing a substantial divergent start point from a direction corresponding to a minimum divergent angle of the laser beam to an optical axis direction and arranged such that the direction corresponding to the minimum divergent angle corresponds to a cross-scanning direction; a collimator lens for changing the divergent light beam from the light source to an approximately parallel light beam in a direction corresponding to a maximum divergent angle of the divergent light beam; a deflector for reflecting the light beam from the collimator lens on a deflection-reflecting face and deflecting the reflected light beam in a main scan-corresponding direction; a first image forming optical system arranged between the collimator lens and the deflection-reflecting face and forming the light beam from the collimator lens as a linear image in a cross scan-corresponding direction; a second image forming optical system arranged between the deflection-reflecting face and the scanned face and setting the positions of the deflection-reflecting face and the scanned face in an approximately conjugate relation in geometrical optics in the cross-scanning direction and forming the light beam deflected by the deflector as an image on the scanned face; and a controller for changing the substantial divergent start point of the light source in the direction corresponding to the minimum divergent angle.

4 Claims, 6 Drawing Sheets

OPTICAL SCANNER

This application is a continuation of application Ser. No. 07/505,456, filed on Apr. 6, 1990, now abandoned.

Priority of application Ser. No. 21785/90 filed on Jan. 31, 1990, application Ser. No. 97017/89 filed on Apr. 17, 1989 and 123190/89 filed on May 17, 1989, in the country of Japan are claimed under the provisions of 35 U.S.C. §119.

BACKGROUND OF THE INVENTION

1. Field of the Invention

The present invention relates to an optical scanner using a laser beam.

2. Description of the Related Art

An optical scanner is known as a device for writing information by scanning a beam of light and is used in a laser printer, a laser facsimile, a laser engraving device, a digital copying machine, etc.

In general, a means for deflecting the light beam by the optical scanner such as a rotary polygon mirror has a so-called deflecting face inclination. To correct this inclination, there is a method in which an image forming lens is arranged between a deflection-reflecting face and a scanned face and constitutes an anamorphic optical system and the positions of the deflection-reflecting face and the scanned face are set in an approximately conjugate relation in geometrical optics with respect to a cross-scanning direction. However, in this method, the image forming lens has refracting powers different from each other with respect to the main scanning direction and the cross scanning direction. Accordingly, it is difficult to preferably correct field curvatures simultaneously in the main and cross scanning directions. Further, when the field curvature in the main scanning direction is preferably corrected, a large field curvature tends to be caused in the cross-scanning direction.

When the large field curvature is caused in the cross-scanning direction, the diameter of a formed image spot on the scanned face in the cross-scanning direction is changed by a scanning position and this change becomes a great obstacle to realization of the optical scanning operation of high density.

In the optical scanner, a special image forming lens system such as an f$\theta$ lens, etc. is generally used to perform the optical scanning operation at an equal speed. Such an image forming lens system has special optical characteristics so that it is difficult to reduce manufacturing cost and therefore reduce the cost of the optical scanner.

On the other hand, the optical scanning operation can be performed at an uniform speed by electrically correcting an image clock signal for synchronization of modulation of the light beam without moving the light beam at an equal speed. From this viewpoint, optical scanners without using the special image forming lens system such as an f$\theta$ lens, etc. have been recently proposed. An optical scanner of a post-objective type is a desirable one of such optical scanners and is shown in Japanese Patent Application Laying Open (KOKAI) No. 60-133414.

In a light-deflector of this post-objective type, it is not necessary to dispose the f$\theta$ lens system and the construction of the deflector is simplified and field curvature is approximately corrected completely with respect to the main scanning direction. The field curvature in the cross-scanning direction is 2 to 5 mm when the optical scanning width corresponds to size A4. There is no problem about the field curvature having such a length when write density by the optical scanning operation is about 400 dpi. However, when the writing operation of high density is performed and the optical scanning width is increased, no diameter of a light spot is constantly stabilized so that quality of printed characters is reduced.

SUMMARY OF THE INVENTION

It is therefore a first object of the present invention to provide a novel optical scanner for easily and reliably removing field curvature in the cross-scanning direction.

A second object of the present invention is to provide a novel optical scanner in which the optical scanner of the above post-objective type is further improved to preferably perform an optical scanning operation for providing an excellent quality of printed characters.

The first object of the present invention can be achieved by an optical scanner comprising a varifocal semiconductor laser light source for emitting a laser beam and displacing a substantial divergent start point from a direction corresponding to a minimum divergent angle of the laser beam to an optical axis direction, the light source being arranged such that the direction corresponding to the minimum divergent angle corresponds to a cross scanning direction; a collimator lens for changing the divergent light beam from the varifocal semiconductor laser light source to an approximately parallel light beam in a direction corresponding to a maximum divergent angle of the divergent light beam; deflecting means for reflecting the light beam from the collimator lens on a deflection-reflecting face and deflecting the reflected light beam in a main scan-corresponding direction; a first image forming optical system arranged between the collimator lens and the deflection-reflecting face and forming the light beam from the collimator lens as a linear image in a cross scan-corresponding direction; a second image forming optical system arranged between the deflection-reflecting face and the scanned face and setting the positions of the deflection-reflecting face and the scanned face in an approximately conjugate relation in geometrical optics with respect to the cross-scanning direction, the second image forming optical system forming the light beam deflected by the deflecting means as an image on the scanned face; and control means for changing the substantial divergent start point of the varifocal semiconductor laser light source in the direction corresponding to the minimum divergent angle.

The second object of the present invention can be achieved by an optical scanner comprising a varifocal semiconductor laser light source for changing a radiant angle of a radiated laser beam in a specific direction perpendicular to a radiant optical axis and arranged such that the specific direction corresponds to a cross scanning direction; a collimator lens for changing the light beam from the varifocal semiconductor laser light source to an approximately parallel light beam in a direction perpendicular to the radiant optical axis and the specific direction; deflecting means for reflecting the light beam from the collimator lens on a deflection-reflecting face and deflecting the reflected light beam in a main scan-corresponding direction; a first image forming optical system arranged between the collimator lens and the deflection-reflecting face and converging the light beam from the collimator lens in the main scan-corresponding direction; a second image forming optical system arranged in a position near the scanned face between the deflection-reflecting face and the scanned face and setting the positions of the deflection-reflecting face and the scanned face in an approximately conjugate relation in geometrical optics with respect to the cross scanning direction; and control means for controlling the radiant angle of the varifocal semiconductor laser light source in the specific direction in synchronization with the optical scanning operation.

Further objects and advantages of the present invention will be apparent from the following description of the preferred embodiments of the present invention as illustrated in the accompanying drawings

DESCRIPTION OF THE PREFERRED EMBODIMENTS

The preferred embodiments of an optical scanner in the present invention will next be described in detail with reference to the accompanying drawings.

An optical scanner in a first embodiment of the present invention has a varifocal semiconductor laser light source, a collimator lens, a deflecting means, first and second image forming optical systems and a control means.

The varifocal semiconductor laser light source emits a laser beam and can displace a substantial divergent start point from a direction corresponding to a minimum divergent angle of the laser beam to a direction of an optical axis. The varifocal semiconductor laser light source is arranged such that the above direction corresponding to the minimum divergent angle corresponds to a cross-scanning direction. A direction of the laser beam at a maximum divergent angle is perpendicular to the optical axis and the direction of the laser beam at the above minimum divergent angle. Accordingly, the direction of the laser beam at the maximum divergent angle corresponds to a main scanning direction.

The collimator lens changes a divergent light beam from the varifocal semiconductor laser light source to an approximately parallel light beam in the direction corresponding to the maximum divergent angle thereof. Accordingly, the light beams emitted from the collimator lens are approximately parallel to each other with respect to a main scan-corresponding direction and are converged or diverged with respect to a cross-scan-corresponding direction.

The deflecting means reflects the light beam from the collimator lens on a deflection-reflecting face and the reflected light beam is deflected in the main scan-corresponding direction.

The deflecting means can be constructed by a known rotary polygon mirror, a pyramidal mirror, a galvanomirror, etc.

The first image forming optical system is arranged between the collimator lens and the deflection-reflecting face to form the light beam from the collimator lens as a linear image in the cross scan-corresponding direction.

The second image forming optical system is arranged between the deflection-reflecting face and the scanned face. In this system, the positions of the deflection-reflecting face and the scanned face are set in an approximately conjugate relation in geometrical optics with respect to the cross-scanning direction. Further, the light beam deflected by the deflecting means is formed as an image on the scanned face.

The control means performs a control operation for changing the substantial divergent start point in the direction corresponding to the minimum divergent angle of the varifocal semiconductor laser light source. This control operation is performed in synchronization with the optical scanning operation by the deflected light beam so as to correct field curvature in the cross-scanning direction by the second image forming optical system.

In the optical scanner, an aperture for restricting the light beam from the collimator lens is commonly used to form the spot shape of the light beam on the scanned face as a desirable shape. In the present invention, the aperture of this kind can be also used.

With respect to the cross-scanning direction, an image is formed by the second image forming optical system with respect to a linear image formed by the first image forming optical system. Accordingly, when the position of the formed linear image is changed, the position of the formed image with respect to the linear image by the second image forming optical system is changed. Therefore, by using this construction, the substantial divergent start point of the varifocal semiconductor laser light source is changed by the operation of the control means so as to correct field curvature in the cross scanning direction.

Figures 1A, 1B:
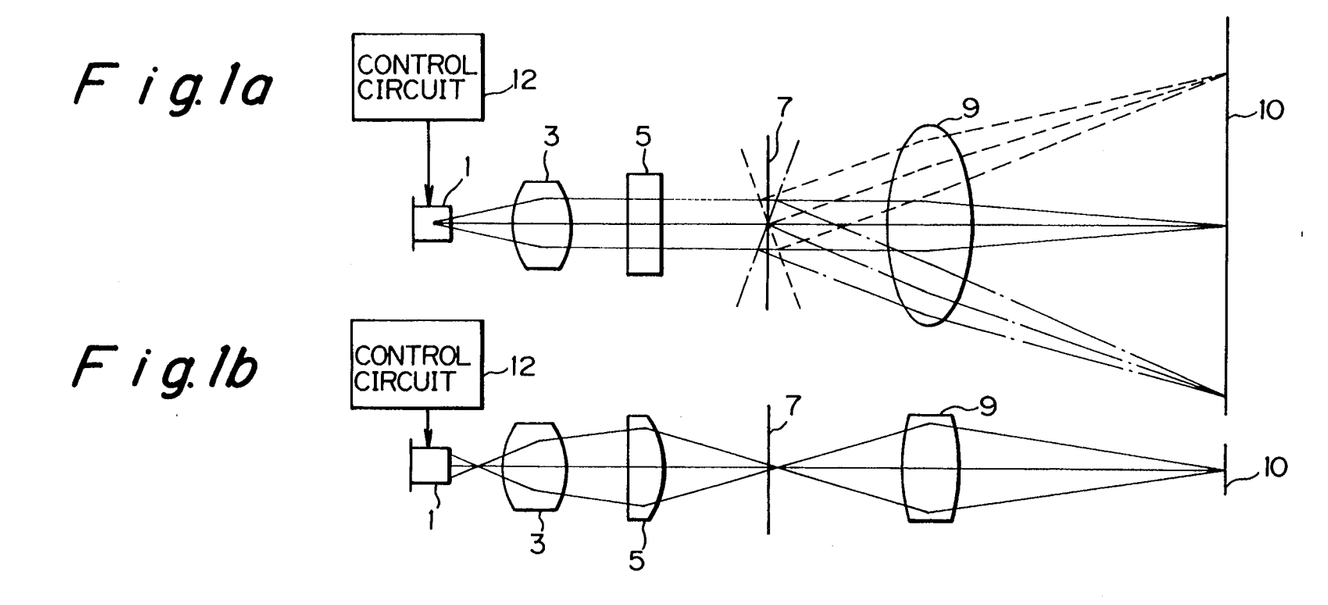
FIGS. 1a and 1b are views for explaining an optical scanner in a first embodiment of the present invention.

FIGS. 1a and 1b schematically show an optical scanner in a first embodiment of the present invention.

FIG. 1a shows an optical path of a light beam developed from a varifocal semiconductor laser light source 1 to a scanned face 10 and seen from a cross-scanning direction. Accordingly, a main scanning direction is the vertical direction of the scanned face 10 in this figure. FIG. 1b shows an optical path of a light beam developed from the varifocal semiconductor laser light source 1 to the scanned face 10 and seen from the main scanning direction. Accordingly, the vertical direction in this figure is the cross-scanning direction.

The varifocal semiconductor laser light source 1 is constructed by a light source using a semiconductor laser described in "Bulletin of electronic technique general institute", VOL. 52, No. 95, pp. 82–83, etc.

Figure 2A:
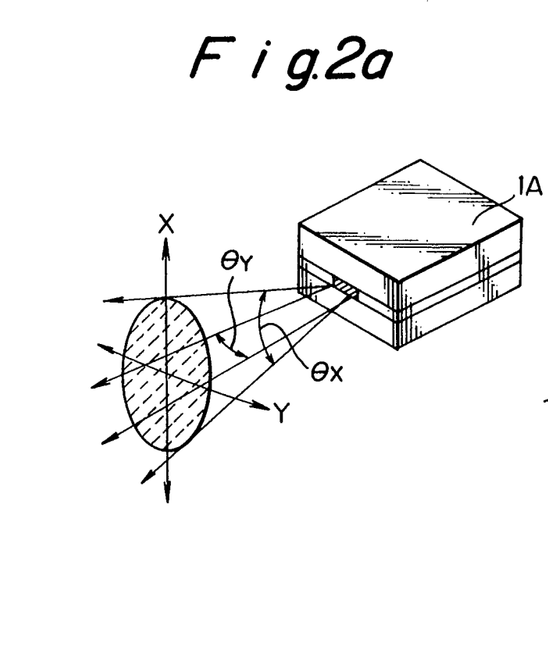
FIGS. 2a and 2b are views for explaining a maximum divergent angle and a minimum divergent angle in the varifocal semiconductor laser light source.

In FIG. 2a, as is well known, a semiconductor laser 1A emits a divergent light beam having an elliptical shape in cross section. When the major and minor axis directions of this light beam having an elliptical shape in cross section are respectively set to X and Y directions, the X direction is a direction corresponding to a maximum divergent angle $\theta_X$ and the Y direction is a direction corresponding to a minimum divergent angle $\theta_Y$.

Figure 2B:
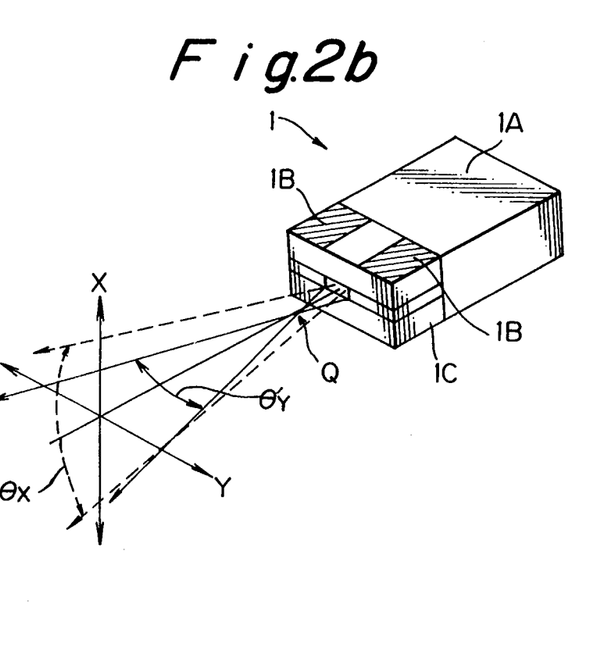

As shown in FIG. 2b, the varifocal semiconductor laser light source 1 has a lens portion 1C and electrode portions 1B on a radiant end face of the semiconductor laser 1A. A radiant angle $\theta'_Y$ of the radiant laser beam (the radiant angle in the direction corresponding to the minimum divergent angle $\theta_Y$ in FIG. 2a) can be changed in accordance with an electric signal applied to the electrode portions 1B from the exterior of the optical scanner. Namely, the change of the electric signal applied to the electrode portion 1B cases a substantial divergent start point of the laser beam in the cross scanning direction to be displaced along the optical axis.

Figure 3A:
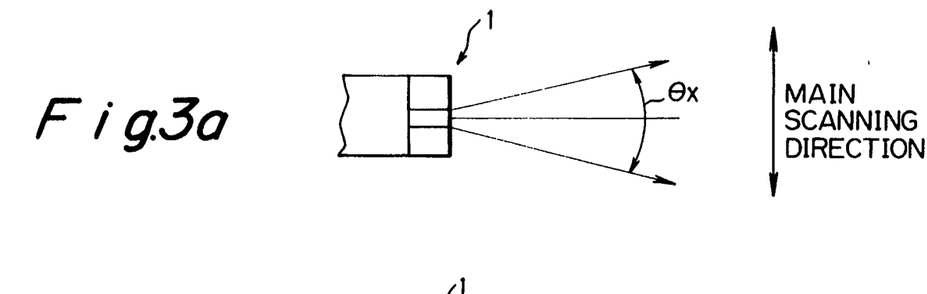
FIGS. 3a and 3c are views for explaining a relation between divergent angles of the laser beam and scanning direction, and explaining a displacement of a substantial divergent start point of the laser beam.
Figure 3B:
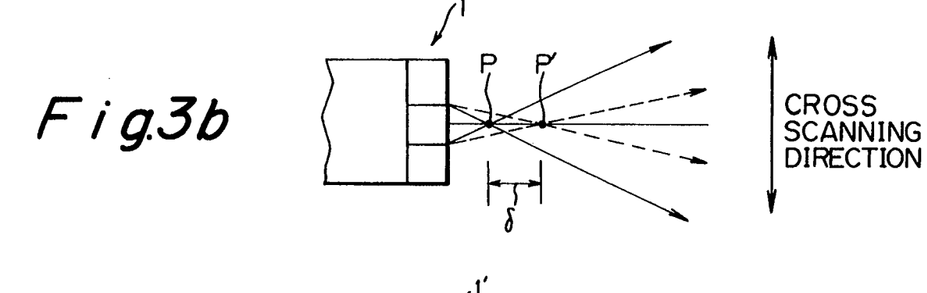

The varifocal semiconductor laser light source 1 is arranged such that the direction corresponding to its minimum divergent angle, i.e., the direction shown as the Y direction in FIGS. 2a and 2b corresponds to the cross scanning direction. Namely, as shown in FIG. 3a, the X direction corresponding to the maximum divergent angle corresponds to the main scanning direction. As shown in FIG. 3b, the direction corresponding to the above-mentioned minimum divergent angle corresponds to the cross scanning direction.

In this embodiment, as shown in FIG. 3b, the light beam emitted from the varifocal semiconductor laser light source 1 is once converged in a linear shape at point P in a state seen from the Y direction and thereafter becomes a divergent light beam. In other words, the point P is the substantial divergent start point in the direction corresponding to the minimum divergent angle.

As mentioned above, the direction corresponding to the minimum divergent angle is the cross-scan-corresponding direction. Therefore, the substantial divergent start point in the direction corresponding to the minimum divergent angle is called a substantial divergent start point in the cross scan-corresponding direction in the following description.

When an electric signal applied to the varifocal semiconductor laser light source 1 is changed, the above converged point can be moved to e.g., a position shown by point P' in FIG. 3b. Namely, in this case, the substantial divergent start point is,displaced by an amount $\delta$ in the optical axis direction. This displacement amount $\delta$ definitely corresponds to the applied electric signal.

Figure 3C:
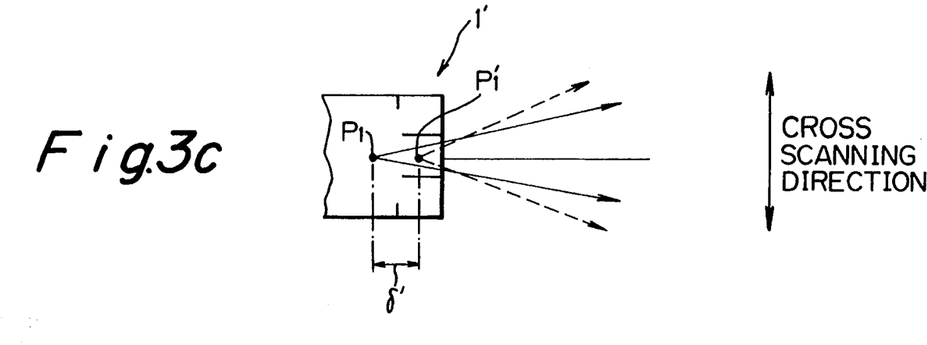

In the example shown in FIG. 3b, the light beam in the cross-scan-corresponding direction from the varifocal semiconductor laser light source 1 is really converged at the substantial divergent start point. However, as shown in FIG. 3c, there is a case in which the substantial divergent start point in the cross-scan-corresponding direction exists as virtual points $P_1$ and $P'_1$ with a varifocal semiconductor laser light source 1' and these points are displaced in the optical axis direction.

Reference numeral $\delta'$ designates a displacement amount of the substantial divergent start point in this case, In FIGS. 1a and 1b, the laser beam from the varifocal semiconductor laser light source 1 is incident to a collimator lens 3 while this laser beam is diverged. In this embodiment, the divergent degree in the cross-scan-corresponding direction is larger at a stage at which the laser beam is incident to the collimator lens 3.

The collimator lens 3 has a function for changing the incident divergent light beam to a parallel beam in the direction corresponding to the above-mentioned maximum divergent angle, i.e., in the main scan-corresponding direction. Accordingly, the light beams emitted from the collimator lens 3 are approximately parallel to each other in the main scan-corresponding direction as shown in FIG. 1a and are slightly divergent in the cross scan-corresponding direction as shown in FIG. 1b.

The light beam emitted from the collimator lens 3 is then incident to a cylindrical lens 5 as the first image forming optical system. The cylindrical lens 5 has a refracting power only in the cross-scan-corresponding direction. Accordingly, as shown in FIG. 1a, the light beam is transmitted through the cylindrical lens 5 as it is with respect to the main scan-corresponding direction. The light beam is then reflected on a deflection-reflecting face 7 and is incident to an anamorphic $f\theta$ lens 9 as the second image forming optical system, thereby forming an image on the scanned face 10 by the action of the lens 9.

In this embodiment, the deflecting means is constructed by a rotary polygon mirror.

With respect to the cross-scan-corresponding direction, when the light beam from the collimator lens 3 is incident to the cylindrical lens 5, the light beam is converged by this lens 5 in the vicinity of the deflection-reflecting face 7. Namely, the light beam is formed as a linear image extending in the main scan-corresponding direction in the above converged position. The light beam is then incident as a divergent light beam to the $f\theta$ lens 9 and is formed as an image on the scanned face 10 by the action of this lens 9. Thus, the laser beam is formed as an image spot formed on the scanned face 10.

The $f\theta$ lens 9 preferably corrects field curvature in the main scanning direction, but there is field curvature in the cross scanning direction.

Figure 4:
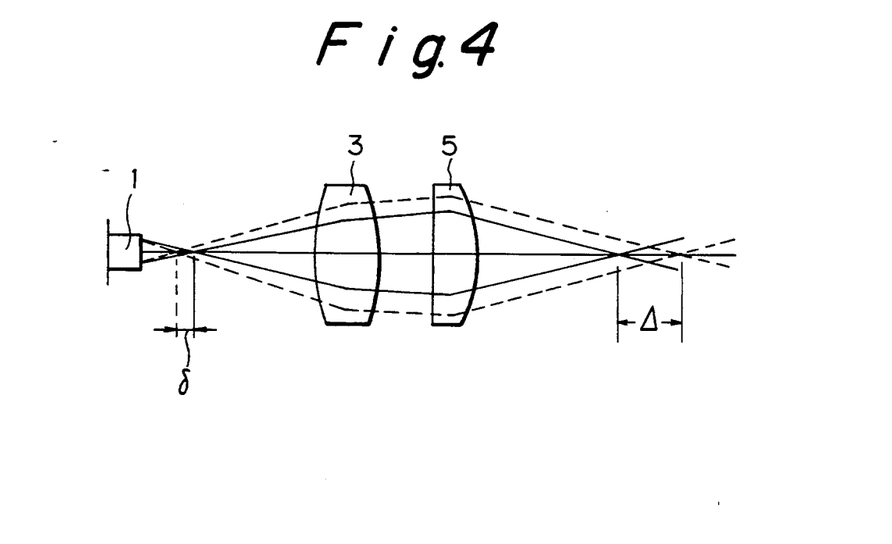
FIG. 4 is a view for explaining variation of an image forming position with the displacement of the divergent start point.

As shown in FIG. 4, when the substantial divergent start point of the light beam emitted from the varifocal semiconductor laser light source 1 in the cross-scan-corresponding direction is changed by distance $\delta$ in the optical axis direction, the position of the above formed linear image is displaced by distance $\Delta$ in the optical axis direction as shown in this figure.

This linear image is an image at the above substantial divergent start point provided by the combined optical system of the collimator lens 3 and the cylindrical lens 5. Accordingly, as is well known, when the lateral magnification of the formed image provided by this combined optical system is set to $\beta$, formula $\Delta=\beta^2\delta$ is formed.

The displacement $\Delta$ of the above linear image causes a displacement Z with respect to the image forming position in the cross scanning direction provided by the $f\theta$ lens 9. The relation between these displacements Z and $\Delta$ is provided by $Z=\gamma^2\Delta$ where $\gamma$ designates the lateral magnification of the f $\Delta$ lens 9. Accordingly, the relation between Z and $\delta$ is provided by $Z=\gamma^2\beta^2\delta$.

Therefore, when the field curvature amount to be corrected is set to W(h) with image height h, it is possible to completely correct the field curvature in the cross-scanning direction if the displacement amount $\delta$ of the substantial divergent start point of the varifocal semiconductor laser light beam 1 in the cross scanning direction is set to $-W(h)/(\gamma^2\beta^2)$ with $\delta$ (h=0)=0.

The image height h is determined by corresponding this image height to a synchronization clock signal for determining synchronization in the optical scanning operation. Accordingly, the relation between the synchronization clock signal in the optical scanning operation and an electric signal for realizing the above ratio $-W(h)/(\gamma^2\beta^2)$ is stored to a control circuit 12 as the control means. The substantial divergent start point in the cross-scanning direction in the varifocal semiconductor laser light source 1 is displaced in accordance with the stored contents according to the synchronization clock signal. Thus, it is possible to preferably perform the optical scanning operation in which the field curvature is removed. The substantial divergent start point in the cross-scanning direction in the varifocal semiconductor laser light source 1 is not necessarily displaced accurately in accordance with the above ratio $-W(h)/(\gamma^2\beta^2)$, but may be displaced by a simpler control approximately satisfying this ratio. The control circuit 12 can be concretely realized by a microcomputer.

Figure 5:
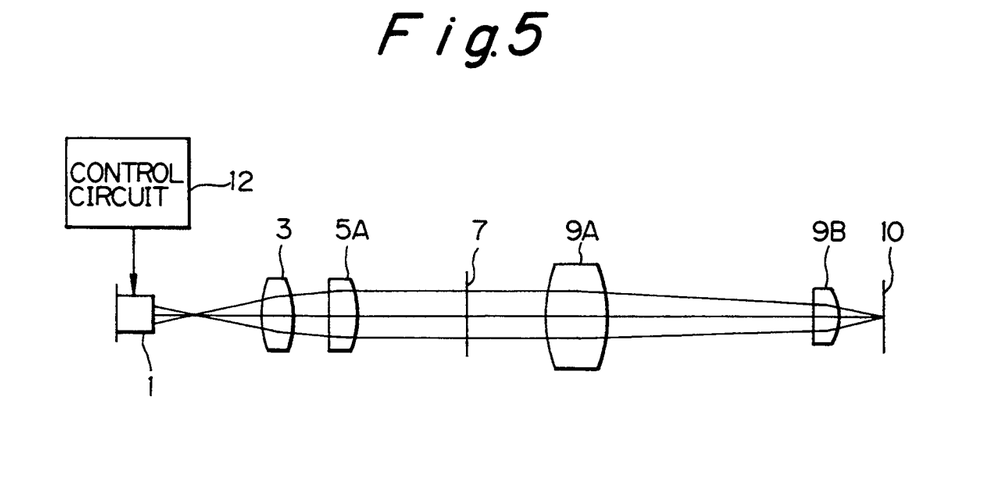
FIG. 5 is a view for explaining an optical scanner in a second embodiment of the present invention.

FIG. 5 shows an optical scanner in a second embodiment of the present invention.

In this embodiment, the first image forming optical system is constructed by a cylindrical lens 5A and the second image forming optical system is constructed by an f$\theta$ lens 9A as a spherical lens and a cylindrical lens 9B having a positive refracting power.

The field curvature in the main scanning direction in the second image forming optical system is preferably corrected.

The differences between this embodiment and the embodiment in FIGS. 1a and 1b are that the position of the linear image formed by a collimator lens 3 and the cylindrical lens is not located in the vicinity of a deflection-reflecting face 7 in the cross scan-corresponding direction, but is located on the image face side of the f$\theta$ lens 9A in the cross scan-corresponding direction. In this case, beam waist diameter is large and is therefore almost not shown in FIG. 5. There is no different between this embodiment and the embodiment in FIGS. 1a and 1b with respect to the main scan-corresponding direction.

In the embodiment of FIGS. 1a and 1b the optical conditions (for example, curvature and thickness) of the collimator lens 3 and the cylindrical lens 5 are so set that the linear image is formed in the vicinity of a deflection-reflecting face 7 in the cross scan-corresponding direction.

In this embodiment, the optical conditions (for example, curvature and thickness) of the collimator lens 3 and the cylindrical lens 5A are so set that the linear image is formed on the image face side of the f$\theta$ lens 9A in the cross scan-corresponding direction.

The light beam from the collimator lens is focused and formed as an image on the scanned face 10 by the action of the f$\theta$ lens 9A with respect to the main scan-corresponding direction. With respect to the cross scanning direction, the light beam is focused and formed as an image on the scanned face by the actions of the cylindrical lenses 5A, 9B and the f$\theta$ lens 9A. The f$\theta$ lens 9A and the cylindrical lens 9B constituting the second image forming optical system set the positions of the deflection-reflecting face and the scanned face in an approximately conjugate relation in geometrical optics with respect to the cross-scanning direction. The linear image formed by the cylindrical lens 5A is formed such that the position of the deflection-reflecting face becomes an object point in geometrical optics with respect to the second image forming optical system. The removal of field curvature is similar to that in the embodiment shown in FIGS. 1a and 1b.

As mentioned above, the present invention provides a novel optical scanner. In this optical scanner constructed as above, it is possible to stabilize the diameter of a formed image beam in the cross-scanning direction and preferably perform an optical scanning operation of high density. Further, the f$\theta$ lens, etc. can be designed to correct the field curvature in the main scanning direction so that it is easy to design these lenses. Further, it is not necessary to displace the optical system to correct the field curvature so that reliability is improved and energy consumption is reduced.

An optical scanner in a third embodiment of the present invention will next be described.

The optical scanner in the third embodiment of the present invention has a varifocal semiconductor laser light source, a collimator lens, a deflecting means, first and second image forming optical systems and a control means.

The varifocal semiconductor laser light source can change a radiant angle of a radiated laser beam in a specific direction perpendicular to a radiant optical axis, and is arranged such that this specific direction (which is called a radiant angle variable direction in the following description) corresponds to a cross-scanning direction. Accordingly, a direction perpendicular to the radiant optical axis and this radiant angle variable direction corresponds to the main scanning direction.

The collimator lens changes the light beam from this varifocal semiconductor laser light source to an approximately parallel light beam in the direction perpendicular to the radiant optical axis and the above radiant angle variable direction, i.e., in a main scan-corresponding direction. Accordingly, the light beams emitted from the collimator lens are approximately parallel to each other with respect to the main scan-corresponding direction and are converged or diverged with respect to the cross-scan-corresponding direction.

The deflecting means is constructed by a rotary polygon mirror having a curved reflecting face described in Japanese Patent Application Laying Open (KOKAI) No. 60-133414.

The first image forming optical system is arranged between the collimator lens and the deflection-reflecting face and converges the light beam from the collimator lens in the main scan-corresponding direction. This first image forming optical system can be constructed by two cylindrical lenses as in the third embodiment described later. However, the first image forming optical system may be constructed by a combination of a spherical lens and a cylindrical lens, or may be constructed by a single anamorphic lens.

The second image forming optical system is arranged in a position near a scanned face between the deflection-reflecting face and the scanned face, and sets the positions of the deflection-reflecting face and the scanned face in an approximately conjugate relation in geometrical optics with respect to the cross scanning direction. This second image forming optical system can be constructed by an elongated cylindrical lens as in the third embodiment described later, a toroidal lens, etc.

The control means controls the radiant angle in the radiant angle variable direction in the varifocal semiconductor laser light source in synchronization with the optical scanning direction.

The above deflection-reflecting face has curvature in the main scan-corresponding direction. The light beam from the collimator lens is formed as an image on the scanned face by the image forming actions of the above first image forming optical system and the deflection-reflecting face by the curvature thereof with respect to the main scan-corresponding direction. The light beam from the collimator lens is formed as an image on the scanned face by the image forming actions of the above first and second image forming optical systems with respect to the cross-scan-corresponding direction. In other words, the mutual relation between the first and second image forming optical systems and the deflection-reflecting face is determined such that such an image forming condition is satisfied.

The radiant angle of the varifocal semiconductor laser light source is controlled by the control means so as to correct field curvature in the cross-scanning direction. Namely, the control operation by the control means is performed to form the light beam incident onto the scanned face as an image on the scanned face in the cross scanning direction at any time irrespective of the deflection angle provided by the deflecting means.

In the optical scanner, an aperture is commonly used to restrict the light beam from the collimator lens so as to form the light spot on the scanned face in a desirable shape. In the third embodiment of the present invention, the aperture of this kind can be also used.

The writing operation with respect to information is performed at an equal speed by electrically correcting an image clock signal for a write signal.

The light beam is converged by the first image forming optical system toward the scanned face with respect to the main scan-corresponding direction, but is deflected by the deflecting means during the converging operation. When the deflection-reflecting face of the deflecting means is planar, an image forming point is approximately moved on an arc around a deflecting start point and is not in conformity with a point on the scanned face. Therefore, the curvature of the deflection-reflecting face is set such that the above image forming point is substantially in conformity with the point on the scanned face with respect to the main scanning direction. Thus, with respect to the main scanning direction, the light beam is substantially formed as an image on the scanned face at any time by the image forming actions of the first image forming optical system and the deflection-reflecting face by the curvature thereof.

With respect to the cross-scan-corresponding direction, the light beam is formed as an image on the scanned face by the image forming actions of the first and second image forming optical systems, but there is field curvature with respect to this formed image. This field curvature in the cross scanning direction is corrected by the control of the radiant angle of the varifocal semiconductor laser light source by the control means.

The varifocal semiconductor laser light source is described in "Bulletin of electronic technique general institute", VOL. 52, No. 95, pp. 82–83, etc.

In this embodiment, the Y direction in FIG. 2b is a radiant angle variable direction and the X direction is a direction perpendicular to the radiant angle variable direction and a radiant optical axis.

The radiant angle $\theta'_Y$ in the radiant angle variable direction can be changed in accordance with an electric signal from the exterior of the optical scanner. This construction means that a substantial divergent start point of the light beam is displaced in an optical axis direction in a state in which the radiant laser beam in the Y direction is seen from the X direction.

In FIG. 2b, reference numeral Q designates the above substantial divergent start point which is called a focal point of the varifocal semiconductor laser light source in the following description.

When the radiant angle $\theta'_Y$ is changed, this focal point Q is displaced on the radiant optical axis, i.e., on an axis passing through an intersection point in the X and Y directions and perpendicular to X and Y planes. In FIG. 2b, the focal point Q is located outside the varifocal semiconductor laser light source. However, in a certain case, this focal point is virtually located within the light source.

In this embodiment, the above radiant angle variable direction corresponds to the cross scanning direction. When the focal point is displaced by the control of the radiant angle, the position of an image formed by the image forming actions of the first and second image forming optical systems in the cross scan-corresponding direction is displaced in the vicinity of a scanned face in the optical axis direction.

The field curvature in the cross-scanning direction is corrected by using this displacement.

A concrete embodiment of the present invention will next be described. In this embodiment, portions corresponding to those in the first and second embodiments are designated by the same reference numerals.

Figure 6A:
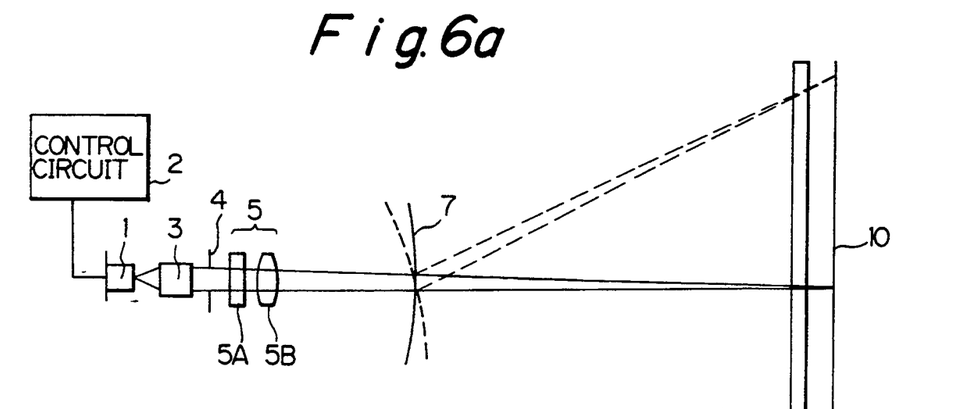
FIGS. 6a and 6b are views for explaining an optical scanner in a third embodiment of the present invention.
Figure 6B:
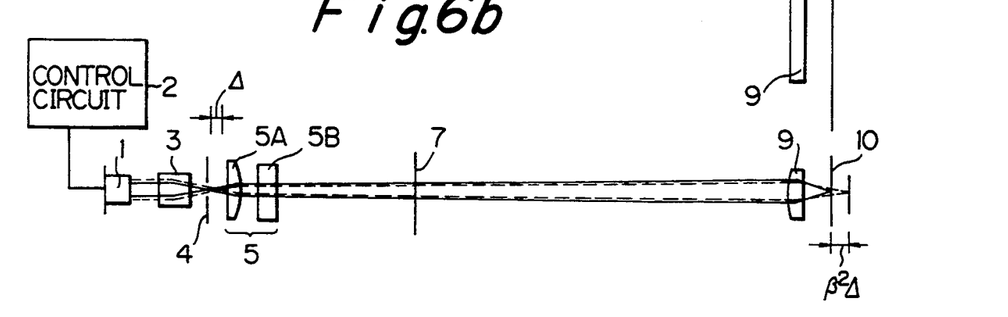

FIGS. 6a and 6b schematically show an optical scanner in the third embodiment of the present invention.

FIG. 6a shows an optical path of a light beam developed from a varifocal semiconductor laser light source 1 to a scanned face 10 and seen from a cross-scanning direction. Accordingly, in FIG. 6a, a direction perpendicular to this drawing is the cross scanning direction. The main scanning direction is the vertical direction of the scanned face 10 in this figure. FIG. 6b shows the above developed state seen from the main scanning direction. Accordingly, in FIG. 6b, a direction perpendicular to this drawing is the main scanning direction.

Figure 7A:
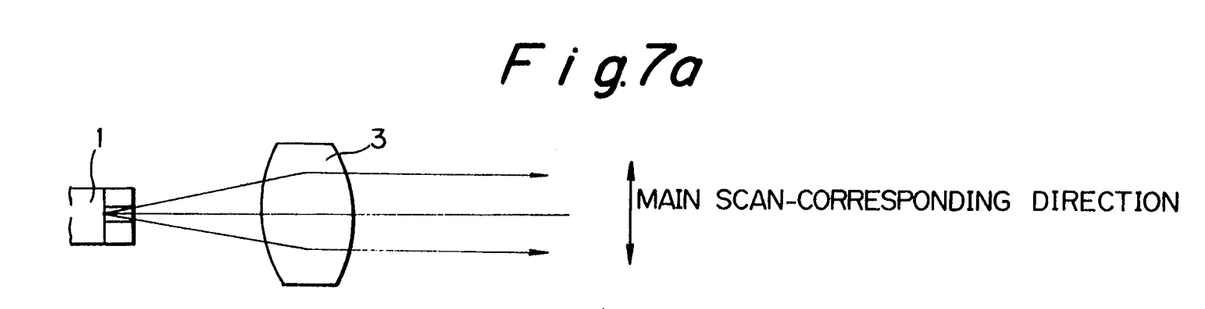
FIGS. 7a and 7b are views showing respectively optical paths in the main scan-corresponding direction and the cross scan-corresponding direction with respect to the third embodiment.

A divergent laser beam from the varifocal semiconductor laser light source 1 is incident to a collimator lens 3. This collimator lens 3 has a function for changing the incident divergent light beam to a parallel light beam in a direction in which no radiant angle is changed. This direction is the X direction in FIGS. 2a and 2b and corresponds to the main scanning direction by the varifocal semiconductor laser light source 1. Accordingly, as shown in FIG. 7a, the light beam emitted from the collimator lens 3 is an approximately parallel light beam seen from the main scan-corresponding direction.

Figure 7B:
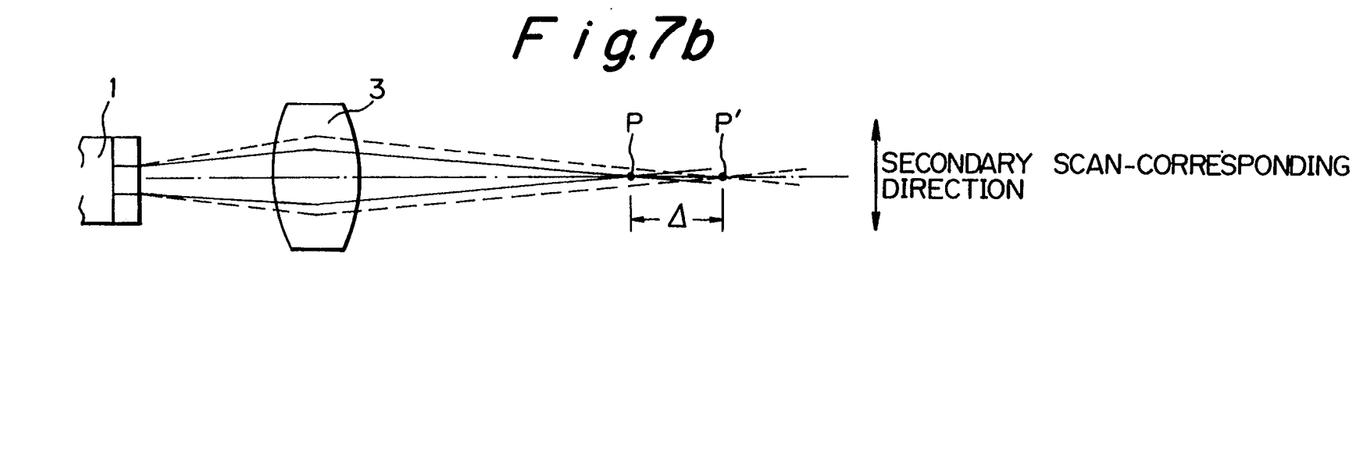

With respect to the cross-scan-corresponding direction, the radiant angle of the light beam incident to the collimator lens 3, i.e., the angle $\theta'_Y$ in FIG. 2b is small so that the light beam emitted from the collimator lens 3 becomes a convergent light beam as shown in FIG. 7b.

In FIGS. 6a and 6b, the diameter of the light beam emitted from the collimator lens, 3 is restricted by an aperture 4 and this light beam is incident to the first image forming optical system 5.

The first image forming optical system 5 is constructed by two cylindrical lenses 5A and 5B. The cylindrical lens 5A has a positive refracting power only in the cross-scan-corresponding direction. The cylindrical lens 5B has a positive refracting power only in the main scan-corresponding direction.

The light beam transmitted through the first image forming optical system 5 is reflected by a deflection-reflecting face 7 and is incident to the scanned face 10 through a second image forming optical system 9.

In this embodiment, the deflecting means is constructed by a rotary polygon mirror. With respect to the main scan-corresponding direction, the deflection-reflecting face 7 has curvature seen from the cross-scanning direction and the light beam is formed as an image on the scanned face 10 by the image forming actions of the cylindrical lens 5B of the first image forming optical system 5 and the deflection-reflecting face 7 by the curvature thereof.

As mentioned above, the cylindrical lens 5B and the curvature of the deflection-reflecting face 7 are set such that the field curvature in the main scanning direction is preferably corrected.

The second image forming optical system 9 is constructed by an elongated cylindrical lens having a positive refracting power only in the cross scan-corresponding direction.

The light beam is formed as an image by the actions of the first and second image forming optical systems 5 and 9 with respect to the cross-scanning direction. As shown by a solid line in FIG. 6b, when the light beam is incident to a central portion of a scanning region, the light beam is formed as an image having a spot shape on the scanned face 10. Accordingly, when the light beam is deflected by the rotation of the deflection-reflecting face 7, an arc field curvature 41 is caused in the cross-scanning direction as shown by a solid line in FIG. 8.

In view of geometrical optics, the second image forming optical system 9 sets a deflecting start point on the deflection-reflecting face 7 and the position of the scanned face in a conjugate relation with respect to each other in the cross-scan-corresponding direction, thereby correcting the inclination of a deflecting face in the deflecting means. In view of wave optics, the waist position of the light beam converged by the first image forming optical system 5 in the cross-scan-corresponding direction is located near the second image forming optical system 9 far away from the deflection-reflecting face 7 and therefore is not shown in FIG. 6b. In FIG. 7b, point P is a point at which a conjugate relation in geometrical optics with respect to this point and the scanned face 10 is set by the cylindrical lens 5A and the elongated cylindrical lens 9 in a state in which the light beam is shown by the solid line in FIG. 6b. Namely, in this state in FIG. 6b, the image at the point P is formed on the scanned face 10 in view of geometrical optics. When the focal point is displaced in the direction of the radiant optical axis by the change in radiant angle of the varifocal semiconductor laser light source 1 in the radiant angle variable direction and thereby the point P is displaced by distance $\Delta$ until position P', as is well known, the image forming position in the cross-scanning direction is shifted by $\Delta' = \beta^2 \Delta$ by using a combined lateral magnification $\beta$ of the cylindrical lens 5A and the elongated cylindrical lens 9.

Figure 8:
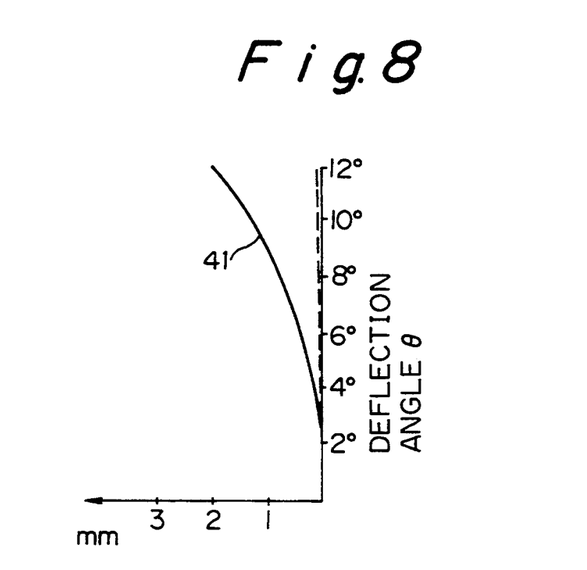
FIG. 8 is a view showing a relation between a deflection angle and the field curvature in the cross-scanning direction produced in the optical scanner of the third embodiment.

Accordingly, when the arc field curvature 41 in FIG. 8 is represented as $-W(\theta)$ as a function of deflection angle $\theta$, the radiant angle of the varifocal semiconductor laser light source 1 is controlled such that $\Delta' = W(\theta)$ is satisfied. Thus, the field curvature in the cross-scanning direction can be preferably corrected as shown by broken line 42 in FIG. 8.

In the following description, reference numeral a designates a distance between a main point of the collimator lens 3 on the object side thereof and a light-emitting end face of the varifocal semiconductor laser light source 1. Reference numeral $f_1$ designates a focal distance of the collimator lens 3 on the rear side thereof. Reference numeral $\Phi$ designates a divergent angle, i.e., a radiant angle of the light beam from the light source 1 in the cross-scan-corresponding direction. Reference numeral $2h$ designates a diameter of the light beam on the light-emitting end face of the light source 1 in the radiant angle variable direction. In this case, when the light beam is converged to a central portion of a main scanning region and the above divergent angle $\Phi$ is set to zero, the above distance $\Delta$ is provided by the following formula.

$$\Delta = \{f_1^2 \cdot \tan\Phi\} / \{h + (a - f_1)\tan\Phi\}$$

Therefore, the control circuit 2 stores thereto commands for relating the deflection angle $\theta$ to an image clock signal for synchronization of the optical scanning operation so that the radiant angle in the varifocal semiconductor laser light source 1 is changed to satisfy the above formula $\Delta' = W(\theta)$ with respect to the field curvature $-W(\theta)$ to be corrected. The radiant angle $\Phi$ of the varifocal semiconductor laser light source 1 is controlled in synchronization with the optical scanning operation.

Thus, it is possible to preferably perform the optical scanning operation with respect to the scanned face 10 in a state in which the spot diameter of the laser beam is approximately constant.

The control circuit 2 can be constructed by e.g., a microcomputer.

As mentioned above, the present invention can provide a novel optical scanner. Since this optical scanner is constructed as above, it is possible to preferably perform the optical scanning operation without using any special image forming lens such as an $f\theta$ lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
    a varifocal semiconductor laser light source for emitting a laser beam;
    a control circuit coupled to said laser light source for changing a radiant angle of a radiated laser beam therefrom in a specific direction perpendicular to an optical axis of a radiant light beam and arranged such that said specific direction corresponds to a cross scanning direction;
    a collimator lens for changing the light beam from said varifocal semiconductor laser light source to an approximately parallel light beam in a direction perpendicular to the radiant optical axis and said specific direction;
    deflecting means for reflecting the light beam from the collimator lens on a deflection-reflecting face and deflecting the reflected light beam in a main scan-corresponding direction;
    a first image forming optical system arranged between said collimator lens and the deflection-reflecting face and converging the light beam from the collimator lens in the main scan-corresponding direction;

a second image forming optical system arranged in a position near a scanned face between said deflection reflecting face and a scanned face wherein the deflection-reflecting face and the scanned face are in an approximately conjugate relation in geometrical optics with respect to the cross scanning direction; and control means for controlling said circuit which alters the electric field of said semiconductor laser so as to alter a position of a substantial divergent start point of the varifocal semiconductor laser light source so as to correct field curvature in the cross scanning direction caused by the second image forming optical system in synchronization with an optical scanning operation by the deflected light beam.

2. An optical scanner as claimed in claim 1, wherein said deflection-reflecting face has curvature in the main scan-corresponding direction.

3. An optical scanner as claimed in claim 2, wherein the light beam from the collimator lens is formed as an image on the scanned face by the image forming actions of said first image forming optical system and the deflection-reflecting face in a curve with respect to the main scan-corresponding direction.

4. An optical scanner as claimed in claim 3, wherein the light beam from the collimator lens is formed as an image on the scanned face by actions of said first and second image forming optical systems in a direction corresponding to said main scanning direction.

* * * * *